US010100705B2

(12) United States Patent
Ilic et al.

(10) Patent No.: US 10,100,705 B2
(45) Date of Patent: Oct. 16, 2018

(54) EXHAUST MIXER AND METHOD OF MAKING SAME

(71) Applicant: Sikorsky Aircraft Corporation, Stratford, CT (US)

(72) Inventors: Vladimir Ilic, Orange, CT (US); Donald William Lamb, Jr., North Haven, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 507 days.

(21) Appl. No.: 14/751,667

(22) Filed: Jun. 26, 2015

(65) Prior Publication Data

US 2016/0138457 A1     May 19, 2016

Related U.S. Application Data

(60) Provisional application No. 62/042,478, filed on Aug. 27, 2014.

(51) Int. Cl.
| | |
|---|---|
| *F02K 1/48* | (2006.01) |
| *F01N 13/08* | (2010.01) |
| *F01N 13/00* | (2010.01) |
| *B01F 5/06* | (2006.01) |
| *F02K 1/82* | (2006.01) |

(52) U.S. Cl.
CPC .......... *F01N 13/082* (2013.01); *B01F 5/0616* (2013.01); *F01N 13/002* (2013.01); *F02K 1/48* (2013.01); *F02K 1/825* (2013.01); *B01F 2005/0639* (2013.01); *F01N 2240/20* (2013.01)

(58) Field of Classification Search
CPC . B01K 5/06; B23P 15/00; F01N 13/00; F01N 13/08; F02K 1/48
USPC .................... 366/337; 60/262, 264
See application file for complete search history.

(56) References Cited

U.S. PATENT DOCUMENTS

| | | | | |
|---|---|---|---|---|
| 4,227,370 A | * | 10/1980 | Kirker | F02K 1/386 60/262 |
| 4,265,646 A | * | 5/1981 | Weinstein | F02C 7/052 244/53 B |
| 4,302,934 A | * | 12/1981 | Wynosky | F02K 1/386 181/220 |
| 4,335,801 A | | 6/1982 | Stachowiak et al. | |
| 4,481,698 A | | 11/1984 | Salerno | |
| 5,444,912 A | | 8/1995 | Folmer | |
| 7,043,898 B2 | | 5/2006 | Rago | |
| 8,069,647 B2 | | 12/2011 | Anderson | |
| 8,590,316 B2 | * | 11/2013 | Conete | F02K 1/386 239/265.19 |
| 9,616,484 B2 | * | 4/2017 | Gekht | B21D 53/92 |
| 2005/0262826 A1 | * | 12/2005 | Anderson | F02K 1/46 60/262 |

\* cited by examiner

*Primary Examiner* — Mark Halpern
(74) *Attorney, Agent, or Firm* — Cantor Colburn LLP

(57) ABSTRACT

An exhaust mixer includes, a plurality of outwardly oriented vanes having planar surfaces, and a plurality of inwardly oriented vanes alternately positioned perimetrically between the plurality of outwardly oriented vanes, and a core flow area defined inwardly of inner most portions of the plurality of inwardly oriented vanes, the exhaust mixer being configured such that a minority of the total flow through the exhaust mixer travels through the core flow area when the exhaust mixer is employed during a mixing operation.

10 Claims, 3 Drawing Sheets

EXHAUST MIXER AND METHOD OF MAKING SAME

CROSS-REFERENCE TO RELATED APPLICATIONS

This application claims the benefit of U.S. provisional patent application Ser. No. 62/042,478, filed Aug. 27, 2014, the entire contents of which are incorporated herein by reference.

STATEMENT OF FEDERAL SUPPORT

This invention was made with government support with the United States Air Force under Contract No. FA8620-06-G-4037-0001. The government therefore has certain rights in this invention.

BACKGROUND

Exhaust mixers are commonly employed on aircraft to cool hot exhaust gases by mixing them with cooler gases that flow around the exhaust mixer. One objective of exhaust mixers is to decrease a size of an exhaust plume that is above certain temperatures to thereby decrease an infrared signature thereby making the aircraft harder to detect with temperature seeking systems. As such, the industry is always receptive to new and efficient exhaust mixing configurations that are easily manufactured.

BRIEF DESCRIPTION

Disclosed herein is an exhaust mixer. The mixer includes, a plurality of outwardly oriented vanes having planar surfaces, and a plurality of inwardly oriented vanes alternately positioned perimetrically between the plurality of outwardly oriented vanes, and a core flow area defined inwardly of inner most portions of the plurality of inwardly oriented vanes, the exhaust mixer being configured such that a minority of the total flow through the exhaust mixer travels through the core flow area when the exhaust mixer is employed during a mixing operation.

Further disclosed herein is a method of making an exhaust mixer. The method includes, forming a plurality of vanes each defined by a plurality of planar surfaces, sizing, shaping and positioning the plurality of vanes such that edges of alternating vanes oriented outwardly and inwardly align with one another thereby forming a core flow area defined inwardly of inner most portions of the inwardly oriented vanes such that an exhaust mixer so configured results in a minority of the total flow through the exhaust mixer traveling through the core flow area when the exhaust mixer is employed during a mixing operation, and attaching the plurality of vanes together.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
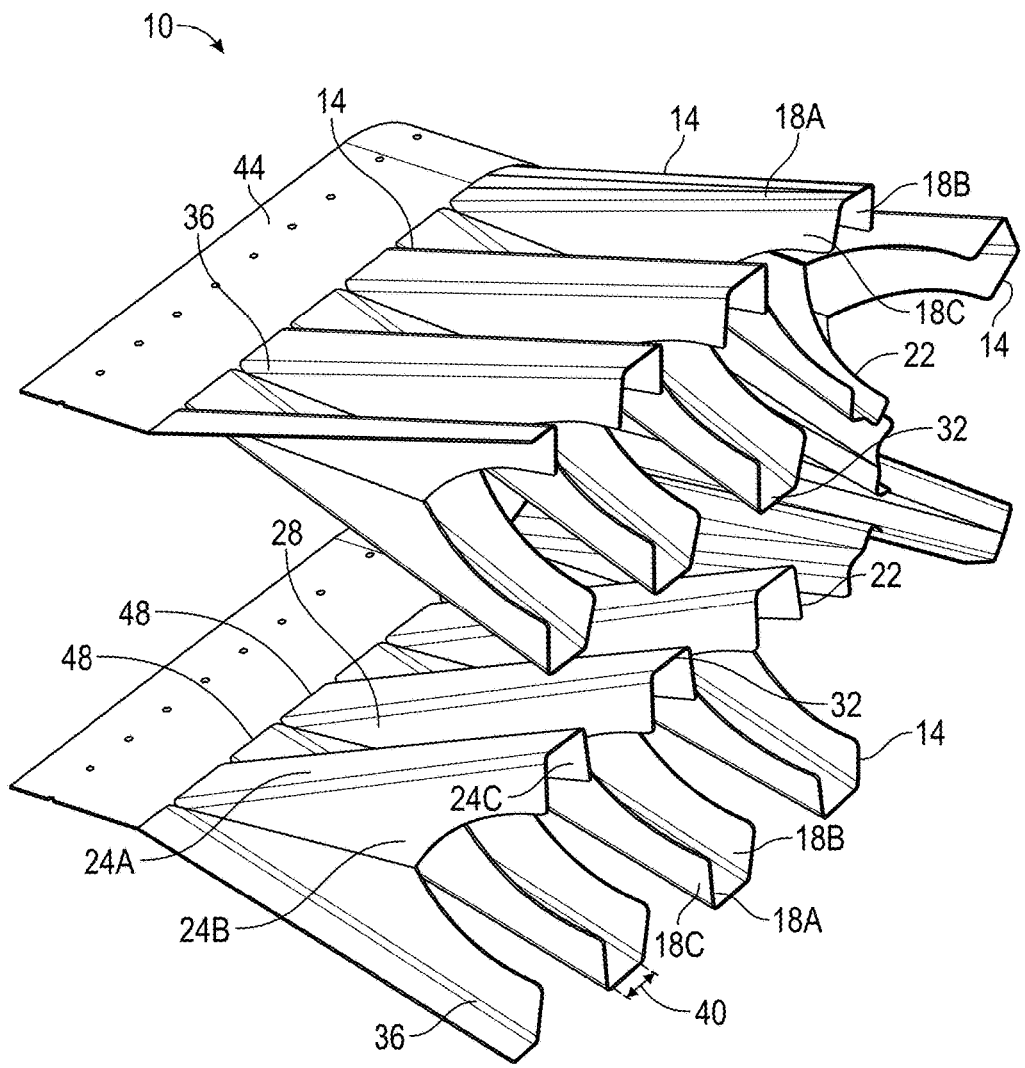
FIG. 1 depicts a perspective view of a portion of an exhaust mixer disclosed herein.
Figure 2:
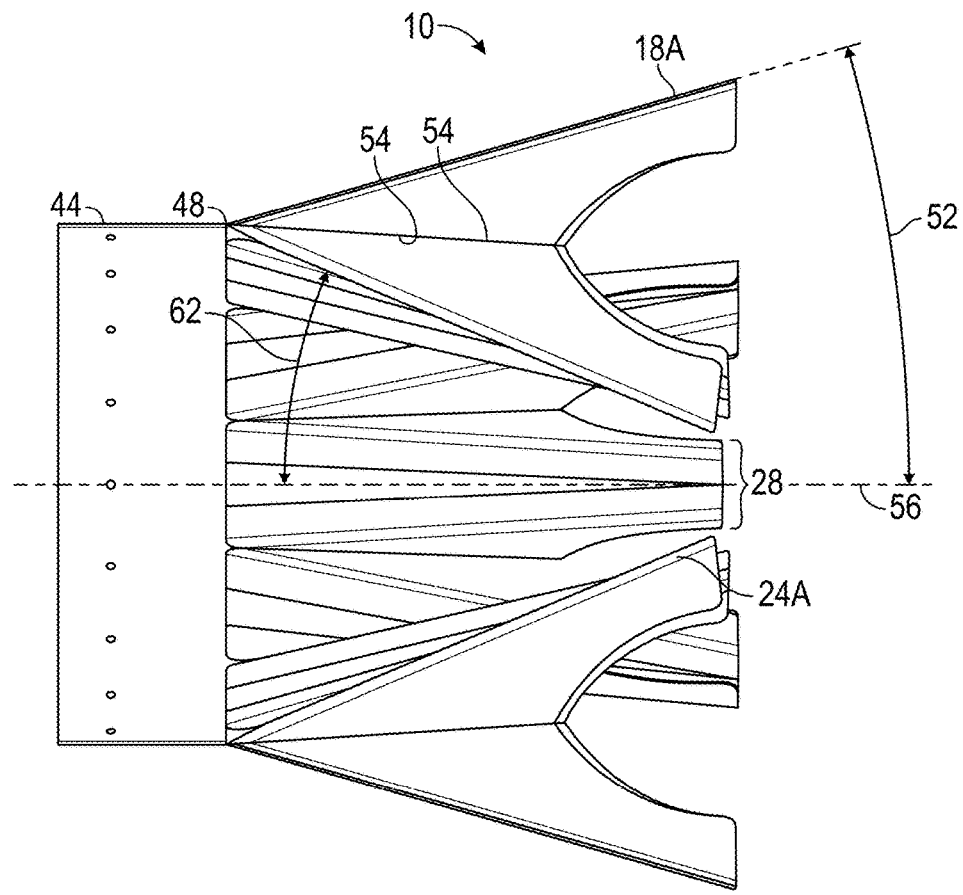
FIG. 2 depicts a side sectioned view of the portion of an exhaust mixer of FIG. 1.

Referring to FIGS. 1 and 2, a portion of an embodiment of an exhaust mixer disclosed herein is illustrated at 10. The exhaust mixer 10 includes, a plurality of outwardly oriented vanes 14, having planar surfaces 18A, 18B, 18C, and a plurality of inwardly oriented vanes 22, having planar surfaces 24A, 24B, 24C, alternately positioned perimetrically between the outwardly oriented vanes 14. A core flow area 28 (best seen in FIG. 4 as discussed below) is defined inwardly of the inner most portions 32 of the inwardly oriented vanes 22 and the exhaust mixer 10 is configured such that a minority of the total flow through the exhaust mixer 10 travels through the core flow area 28 when the exhaust mixer 10 is employed during a mixing operation. More particularly 40 percent or less of the total flow through the exhaust mixer flows through the core flow area 28.

In one embodiment fillet radii 36 join the planar surfaces 18A, 18B, 18C, 24A, 24B, 24C to one another. A radius of the fillet radii 36 are small relative to a width dimension 40 of the planar surfaces 18A and 24A. In some embodiments the radius for the fillet radii 36 are defined as being in the range of about ⅕ to ¹⁄₁₀ of the dimension 40.

The planar surfaces 18A, 18B, 18C, 24A, 24B, 24C simplify the fabrication of the vanes 14, 22 since a standard brake form tool can be used to form the vanes 14, 22 out of sheets of material such as metal, for example. The planar surfaces 18A, 18B, 18C, 24A, 24B, 24C also facilitate attaching them to one another and to a flue 44 at a leading edge 48 of the vanes 14, 22. The leading edges 48 can overlap with or butt against the flue 44 when being attached through welding, adhesive or other attachment methods. Similarly, edges 54 of each of the vanes 14, 22 can butt against or overlap the edges 54 of the vanes 14, 22 perimetrically adjacent thereto when attaching them together via welding, adhesive or other attaching methods. In one embodiment the planar surfaces 18B and 18C may be parallel to an axis 56 of the exhaust mixer 10. Additionally, the planar surfaces 18A are positioned and sized such that they form an angle 52 relative to the axis 56 of the exhaust mixer 10 that is in a range of about 10 to 25 degrees and more specifically in the range of about 14 to 18 degrees, as best shown in FIG. 2. Similarly, the planar surfaces 24A are sized and positioned in one embodiment such that they form an angle 62 relative to the axis 56 of the exhaust mixer 10 that is in a range of about 10 to 25 degrees and more specifically in the range of about 14 to 18 degrees.

Figure 3:
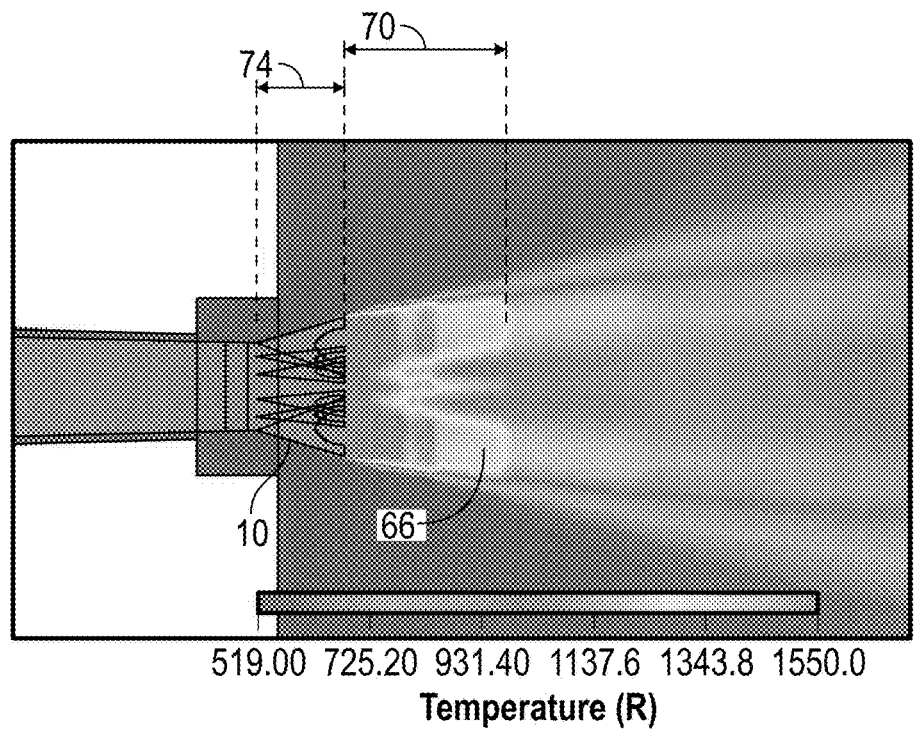
FIG. 3 depicts a side view thermal image of an exhaust mixer disclosed herein with a plume of hot fluid imaged as it exits the exhaust mixer.

Referring to FIG. 3, the foregoing structure results in the exhaust mixer 10 having very efficient mixing of hot fluid flowing through the flue 44 and within the vanes 14, 22 with cooler fluid flowing outside of the flue 44 and the vanes 14, 22. This efficient mixing creates a plume 66 having a short thermal plume length 70.

Figure 4:
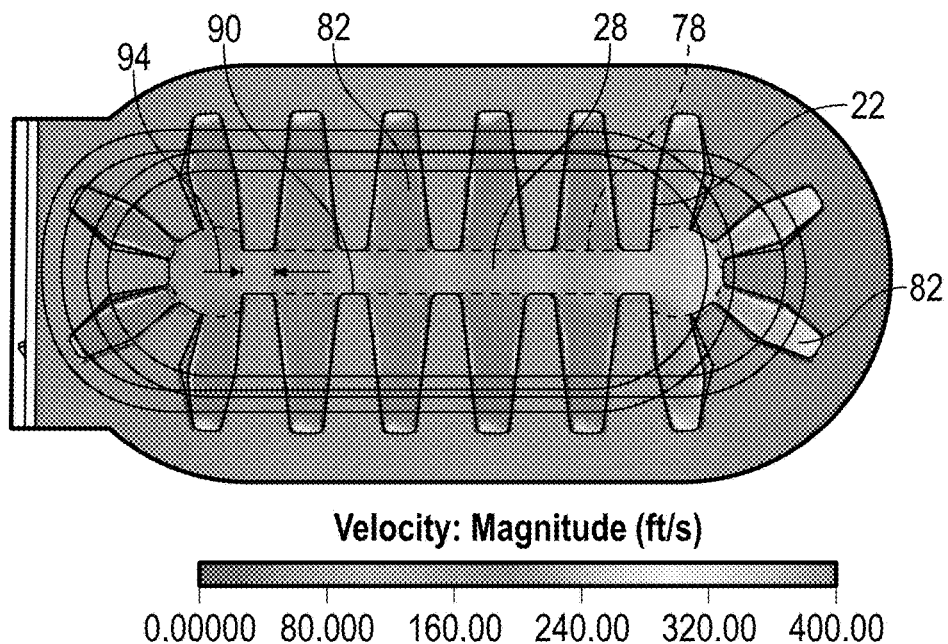
FIG. 4 depicts an end view thermal image of an exhaust mixer disclosed herein.

Referring to FIG. 4, the thorough mixing of fluid flowing through mixer 10 with fluid flowing around the mixer 10 is in part due to how flow through the mixer 10 is distributed. The core flow area 28 is shown in this end view of the mixer 10 as the area within a dashed line 78 that connects the inner most portions 32 of each of the inwardly oriented vanes 22. Non-core flow area 82 is the area defined within the vanes 14, 22 that is outside of the core flow area 28. As mentioned above, the portion of total flow through the exhaust mixer 10 that flows through the core flow area 28 is in the range of about 40 percent or less. This means the balance or about 60 percent or more of the total flow through the exhaust mixer 10 flows through the non-core flow area 82.

In one embodiment the planar surfaces 24 are configured such that the inner most portions 32 of the inwardly oriented vanes 22 have straight ends 90 over a dimension 94. The close proximity of the inner most portions 32 of the opposing inwardly oriented vanes 22 and the dimension 94 create localized flow blockage. This localized flow blockage redirects some flow from the core flow area 28 to the non-core flow area 82 in comparison to a design that does not have the straight ends 90 but employs curved ends instead. The foregoing structure also accelerates flow past the inner most portions 32 in the core flow area 28 thereby increasing vorticity resulting in more expedient mixing.

The design of the exhaust mixer 10, by distributing a high percentage of the total flow outside of the core flow area 28, increasing the exit angle 52 of the outwardly oriented vanes 14 away from the core flow area 28 and maintaining the planar surfaces 18A, 18B, and 18C, improves the mixing of the fluids over conventional exhaust mixers, thereby decreasing the thermal plume length 70 by as much as 40 to 50 percent. This also reduces an area of the plume 66 that contributes to an infrared signature. Embodiments disclosed herein also improve performance related to pressure loss when compared to conventional exhaust mixers.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. An exhaust mixer comprising:
   a plurality of outwardly oriented vanes having planar surfaces;
   a plurality of inwardly oriented vanes alternately positioned perimetrically between the plurality of outwardly oriented vanes, wherein an edge of the plurality of inwardly oriented vanes is coupled to an adjacent edge of the plurality of outwardly oriented vanes, the edges being disposed centrally between opposing planar surfaces of the plurality of outwardly oriented vanes and the plurality of inwardly oriented vanes; and
   a core flow area defined radially inwardly of inner most portions of the plurality of inwardly oriented vanes, the exhaust mixer being configured such that only a portion of a total flow through the exhaust mixer travels through the core flow area when the exhaust mixer is employed during a mixing operation, wherein the flow through the core flow area is less than about 40 percent of the total flow through the exhaust mixer.

2. The exhaust mixer of claim 1, wherein planar surfaces of the plurality of outwardly oriented vanes form an angle relative to an axis of the exhaust mixer in a range of about 10 to 25 degrees.

3. The exhaust mixer of claim 2, wherein the angle is in a range of about 14 to 18 degrees.

4. The exhaust mixer of claim 1, wherein the plurality of outwardly oriented vanes and the plurality of inwardly oriented vanes are configured, sized and positioned to form a short thermal plume length.

5. The exhaust mixer of claim 1, wherein all surfaces of the plurality of outwardly oriented vanes are planar.

6. The exhaust mixer of claim 1, wherein a fillet radius joins the planar surfaces of the plurality of outwardly oriented vanes.

7. The exhaust mixer of claim 1, wherein all surfaces of at least one of the plurality of inwardly oriented vanes are planar.

8. The exhaust mixer of claim 1, wherein leading edges of the plurality of outwardly oriented vanes and leading edges of the plurality of inwardly oriented vanes are attached to a flue.

9. The exhaust mixer of claim 1, wherein edges of each of the plurality of outwardly oriented vanes butt against edges of each of the plurality of inwardly oriented vanes that is perimetrically adjacent thereto.

10. The exhaust mixer of claim 1, wherein the inner most portions of the inwardly oriented vanes have straight ends over a selected dimension.

* * * * *